Figure 4:
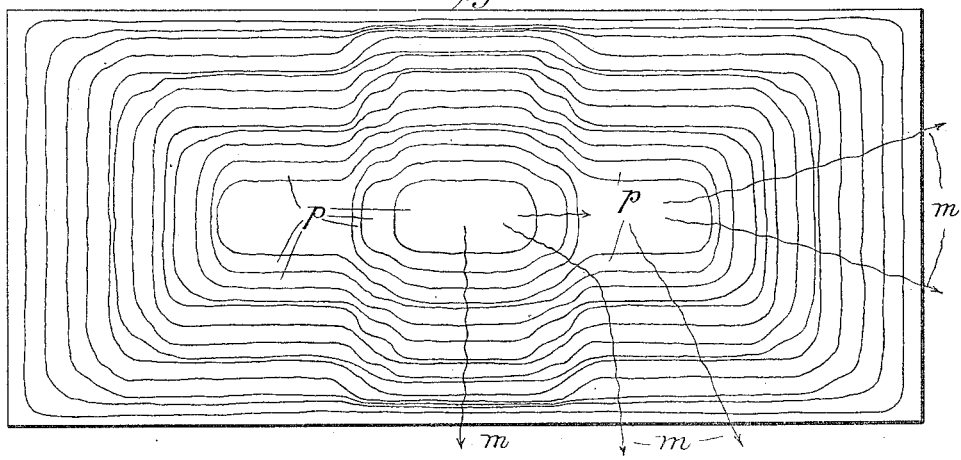

May 1, 1928. 1,667,832
L. BARTELSTONE
METHOD OF AND APPARATUS FOR LAMINATING GLASS
UNDER INCREMENTAL DIFFERENTIAL PRESSURES
Filed July 27, 1926  2 Sheets-Sheet 1
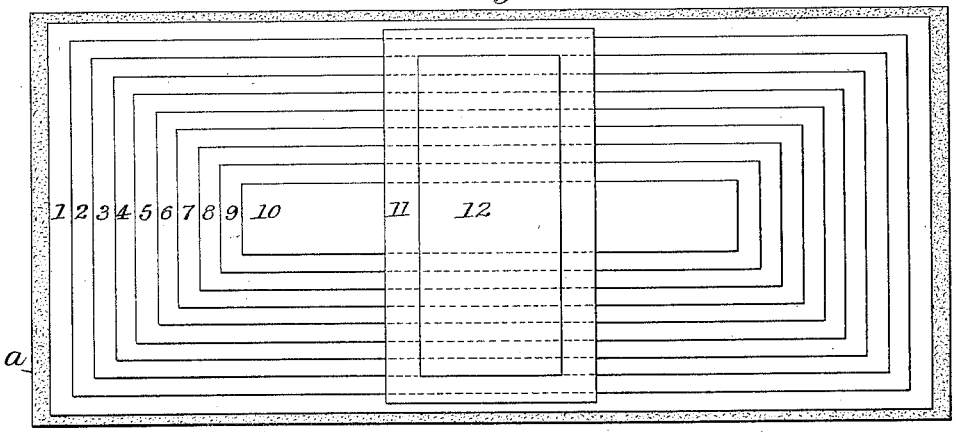
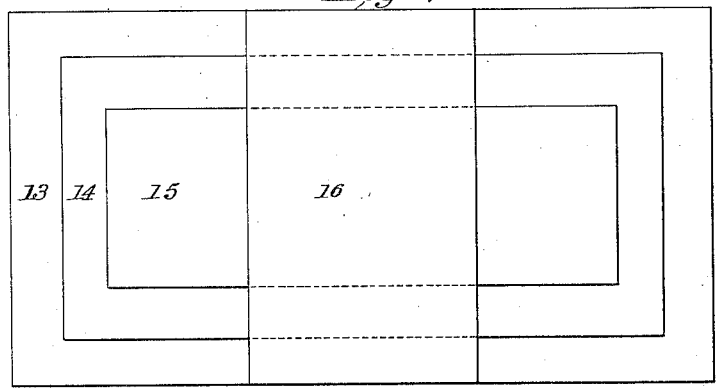
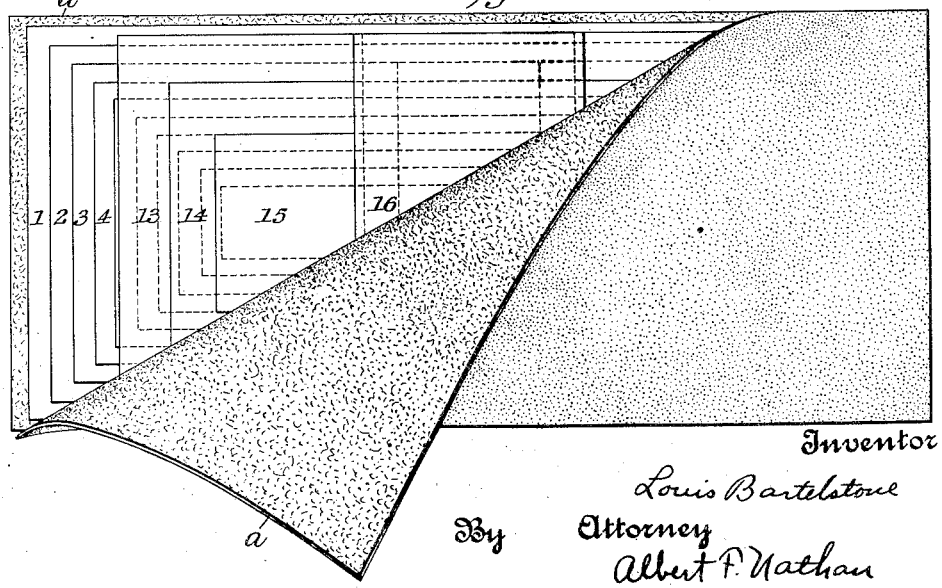
Inventor
Louis Bartelstone
By Attorney
Albert F. Nathan May 1, 1928.                                                         1,667,832
L. BARTELSTONE
METHOD OF AND APPARATUS FOR LAMINATING GLASS
UNDER INCREMENTAL DIFFERENTIAL PRESSURES
Filed July 27, 1926          2 Sheets-Sheet 2

Fig. 6.ᵃ

Inventor
Louis Bartelstone
By Attorney
Albert F. Nathan

Patented May 1, 1928.

1,667,832

UNITED STATES PATENT OFFICE.

LOUIS BARTELSTONE, OF FLATBUSH, NEW YORK.

METHOD OF AND APPARATUS FOR LAMINATING GLASS UNDER INCREMENTAL DIFFERENTIAL PRESSURES.

Application filed July 27, 1926. Serial No. 125,210.

This invention relates to a method of and an apparatus for accomplishing the lamination of glass.

Laminated glass consists of outer plates of glass and an intervening sheet or sheets of celluloid, or other non-brittle substance, all securely held together by adhesion.

In the manufacture of this product, the faces of the glass to be united to the intervening sheet or sheets are coated with a suitable fluid which will effect a union of the laminæ. They are then assembled and subjected to pressure which serves to expel the uniting fluid in a manner such as will effect a permanent union between the flexible and comparatively stiff plates. The lamination must be so done that the adhesion shall be continuous and uniform and there must be no spots or regions of an optically imperfect appearance.

When the laminæ are compressed between conventional platens, the glass and the celluloid, if of substantial area, tend to establish sealing contacts so as to circumscribe one or more local regions; forming pockets which retain air or excess fluid with the result that an imperfect union is effected and a defective product is produced.

To produce a uniformly complete-adhesion, it is absolutely essential, that no excess fluid shall be permanently pocketed in any local areas and that no air-bubbles shall be permitted to remain between the sheets.

Now, this invention is predicated upon my discovery that all such tendencies towards "pocketing" may be very efficiently yet easily precluded by the application of a differentially graduated compression, whereby the ultimate contact grows from a more or less central spot and progressively lengthens and spreads spoke-like or branch-like; permitting the fluid to escape through flared channels which gradually shorten and narrow (until ultimately eliminated) as the cohesion extends. This invention accordingly proposes so to apply and progressively develop the sealing pressure that channels will be initially provided and progressively reduced between the adjacent faces of the sheets; these channels affording a sufficiently free egress of the fluid (together with any air bubbles) and thereby prevent any pocketing of these elements.

One convenient method of carrying out this new and improved process consists in preparing and assembling the sheets of glass and the sheet, or sheets, of celluloid in the usual manner, placing the whole under a slight pressure to expel the greater portion of the fluid before any substantial adhesion is effected, then increasing the pressure more rapidly at the central region of the laminæ to effect substantially complete expulsion of the fluid at that region, thereby to effect complete cohesion of a small central area; then gradually to extend, in certain general directions, the area upon which the increased pressure is exerted, said area constantly being of such a contour as to provide slightly depressed channels which permit unobstructed egress of the fluid; continuing to extend the area of maximum pressure and gradually closing said channels from their innermost ends until the fluid is expelled and a perfect and uninterrupted union is effected between the laminæ.

It is, of course, desirable, in the interest of economy that this process be carried out more or less rapidly, by conventional mechanism, and by operators of ordinary skill and intelligence.

Figure 5:
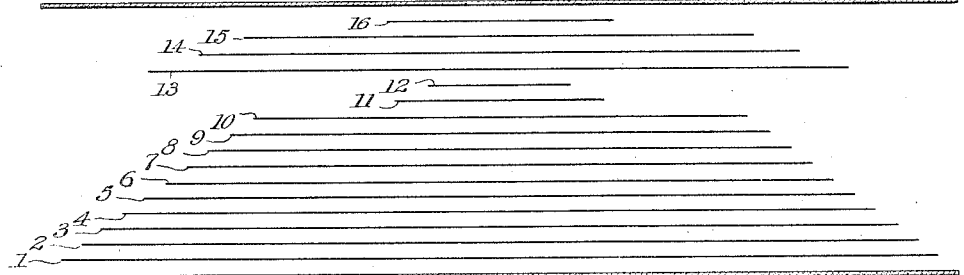
Figure 6:
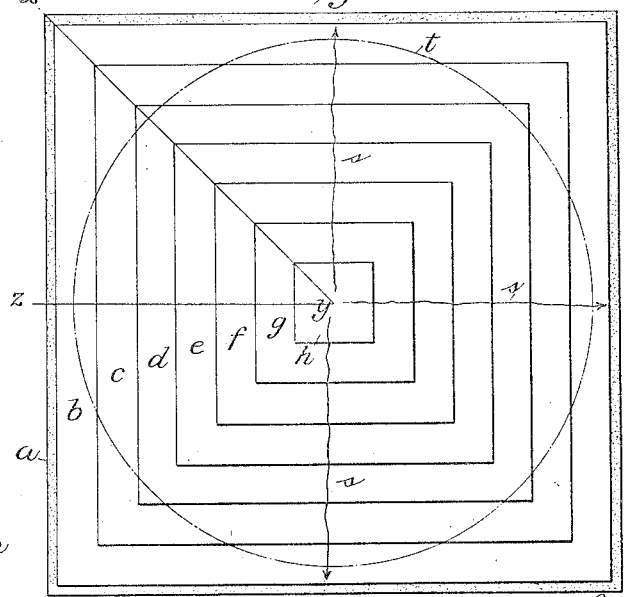

This invention therefore also proposes an apparatus capable of being used in conjunction with a power press of conventional form for effecting the lamination of glass by the improved process. This apparatus includes a platen or platens, adapted to be placed in contact with one, or both, of the outside sheets of glass before the laminæ are placed in the press, said platens being formed with an undulated surface having a summit adapted to be arranged in proximity to the central region of the laminæ. By the use of such a platen the pressures may be applied upon the laminæ as hereinbefore described by the mere gradual closing of the power press. Two forms of platens for this purpose are disclosed in the annexed drawings, and in these drawings Fig. 1 is a view in plan of an uncompleted platen. Fig. 2 is a similar view of another portion of the platen which is adapted to be superimposed upon the portion shown in Fig. 1. Fig. 3 is a plan of the platen complete, the upper covering sheet being shown as rolled back to bring to view the underlying portions. Fig. 4 is a topographical map of one of the improved platens representing the various elevations, from which it will be seen that the pressure will be applied successively upon regions extending outwardly from the central region and that certain regions thereof will assume a steeper angle than certain other regions, thereby providing valley-like slopes which will permit free egress of the fluid. Fig. 5 is a longitudinal section through the completed platen the parts being shown as separated for the sake of clearness. Fig. 6 is a plan view of an elementary form of the platen, which is particularly adapted for the manufacture of circular disks of laminated glass. Fig. 6ª is a diagram representing in exaggerated proportions the difference in degree of angularity of the incline of the platen at the side thereof as compared with the degree of angularity of the platen along a line extending from the center to one corner of the platen, illustrating that the former incline is substantially steeper than the latter and will therefore serve as a channel more rapidly to carry off the fluid.

Referring more particularly to the drawings and first to the elementary form of platen shown in Fig. 6 by means of which the improved process may be carried out, the platen may comprise a base $a$, preferably of fabric such for example as flannel which will permit of slight compression. Pyramided upon this base is a plurality of sheets, $b$, $c$, $d$, $e$, $f$, $g$, and $h$, preferably, but not necessarily of paper, each of which is of less area than the preceding one. These sheets are practically incompressible whereas the base does permit of slight compression with the result that when the laminæ and the platen are inserted within the press and the press is closed slowly the first action will be a slight pressure on substantially the entire surface of the laminæ. This initial pressure will serve to expel a substantial portion of the fluid from between the laminæ without effecting a seal of any portion thereof a slight film of the fluid remaining therebetween.

Inasmuch as it is desired first to seal the central region of the work, the platen and the laminæ are initially so arranged for a pressing operation that the thickest portion of the platen (comprising in Fig. 6 the portion containing the cap-sheet $h$) is in alignment with the central portion of the work. After the initial low pressure has been applied and a substantial quantity of the fluid has been expelled the pressure is gradually increased thereby exerting great pressure on the area in the vicinity of the cap-sheet $h$. This pressure serves to squeeze out the film of oil which resisted the low initial pressure and thereby effects a complete union of the laminæ in that region. A continued application of pressure will then effect the next highest elevation which comprises the marginal portions of the sheet $g$ beyond the edges of the sheet $h$. The slight compressibility of the base $a$ may effect this more or less gradually. This action continues until the union between the laminæ is complete.

An important feature of this invention resides in the provision, in the platen, of surfaces which serve in the nature of valleys to carry off the fluid expelled by the successive actions of the sheets $h$, $g$, etc. This has been effected by shaping the compression sheets unlike the shape of the laminæ to be united. This is very clearly illustrated in Figs. 6 and 6ª, with reference to a circular disk of work $t$. Where the work is circular the compression sheets may be square as shown. From an inspection of the above mentioned figures it will readily be perceived that the degree of the angle of elevation along the line $y$—$z$ is substantially greater than along the line $y$—$x$. This is due to the fact that although the altitude of the triangle $w$—$y$—$z$ is the same as that of the triangle $w$—$y$—$x$ their bases and hypothenuses are unequal. Because of this difference in the angle of elevation the fluid will flow more rapidly along the intermediate regions as represented by the arrows $s$ and therefore these regions will serve as a drain for the less inclined regions along the lines $x$—$y$.

If desired a covering sheet of fabric, similar to the base $a$, may be placed over the pyramided compression sheets.

It is, of course, necessary that too sudden changes in thickness in the platen be avoided, otherwise the laminæ could not conform to the undulated surface of the platen and breakage would result. It has been found by actual experience that sheets of paper of .003 inch in thickness form an ideal platen and produce perfect results, but this thickness may be varied without defeating the principle of the invention.

Where large and non-circular laminæ are to be united the construction of the platen becomes somewhat more complex but the underlying principle is the same as that hereinbefore described. Figs. 1, 2 and 3 show a platen particularly adapted for pressing large rectangular laminæ from which it is more difficult wholly to expel the fluid than from the circular work as shown in Fig. 6. This platen also preferably comprises outer covers $a$ of fabric between which are arranged, in an order to produce a series of successively acting compression surfaces and valley regions, a plurality of sheets, preferably of paper, of varying size. As shown in Figs. 1 and 2 this platen may be built up of uniformly arranged (in pyramidal form) rectangular sheets 1, 2, 3, 4, 5, 6, 7, 8, 9 and 10, of gradually reduced area. Upon these sheets are placed, transversely thereof, sheets 11 and 12 also of rectangular form and of unequal area. Superimposed upon the sheets 1 to 12, inclusive, are sheets 13, 14, 15 and 16 of which the first three are arranged similarly to the sheets 1 to 10 while the latter is arranged similarly to the sheets 11 and 12 and overlying the same.

As represented in Fig. 4, these transversely arranged and overlapping sheets provide unequal thicknesses in various regions which produce an irregular surface comprising successively acting compression areas designated as *p* and valley-slopes represented by the arrows *m* which latter, due to the decreased pressure on the laminæ in those regions, permit unobstructed and complete egress of the fluid from between the laminæ.

In utilizing this new process, the laminæ and the platen, or platens, at one or both sides thereof, are preferably placed between blankets affording substantial compressibility and the whole is then inserted between the relatively movable plates of a power press for compression. Corrugated rubber has been found to be a particularly satisfactory material for the blankets inasmuch as it affords the required resiliency and becomes sufficiently compact and positive under high pressure while possessing the quality of restoring itself to its original form and condition when the pressure is relieved.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims.

Having thus revealed this invention, I claim as new and desire to secure the following combinations and elements, or equivalents thereof, by Letters Patent of the United States.

1. The process of laminating glass which comprehends the step of pressing the laminæ between two platens; the surface of at least one of which is slightly vallied in transverse directions in an anti-clinal manner.

2. In the art of laminating glass, the step of expressing adhesive fluid from between laminæ which consists in pressing them between two substantially rigid platens; one of which is surfaced with a comparatively thin and but slightly yieldable pad graduated in thickness to form valley-like slopes from a central region, whereby the laminæ will be forced into ultimate contact progressively from points remote from the edges while providing very shallow gradually shortening channels for the egress of the fluid.

3. A glass-laminating method which consists in coating the several laminæ with an adhesion-promoting fluid; then super-imposing them; then first applying pressure chiefly to a spot-area near the vertical axis of the pile and increasing said pressure simultaneously throughout all superficial areas but differentially in any given circular line.

4. An apparatus for laminating glass comprising a pressure-element having an undulated surface providing a summit in proximity to its central region and hill and dale areas extending radially therefrom, said pressure-element being adapted to exert the maximum pressure of its various superficial elemental areas differentially, whereby the pressure will progressively increase more rapidly from the inner to the outer ends of two separated radial paths than along an intermediate radial path.

5. The process of laminating glass which comprehends the step of pressing the laminæ between two platens; the surface of at least one of which has a limited yield under pressure and is slightly vallied in transverse directions in an anti-clinal manner.

6. The art of expressing adhesive fluid between brittle and non-brittle laminæ which consists in pressing them between two pressure elements; one of which has a superficially graduated yield to form in the cleavage planes of the laminæ valley-like slopes from a central region, whereby the laminæ will be forced into ultimate contact progressively from points remote from the edges while providing very thin channels which under the continuation of the pressure will gradually shorten and progressively eject the fluid from between the laminæ.

7. A platen, for use in the lamination of glass, having a surface slightly vallied in transverse directions in an anti-clinal manner.

8. A platen, for use in the lamination of glass, having a plurality of irregular and successively acting compression surfaces extending outwardly from the center thereof, and valley-like slopes to retard compression on certain general regions.

9. A platen, for use in the lamination of glass, comprising a plurality of superimposed sheets of unequal size providing an undulated surface having slopes of varying degrees.

10. A platen, for use in the lamination of circular disks of glass comprising a plurality of superimposed non-circular sheets of varying size arranged in pyramidal form with the apex in the central region, said sheets being so arranged as to provide slopes of unequal angularity.

11. A platen, for use in the lamination of glass, comprising a base sheet and a plurality of transversely arranged sheets of varying size superimposed upon said base sheet.

12. A platen, for use in the lamination of glass comprising a plurality of sheets of substantially incompressible material of varying size, and a sheet of compressible material at one side thereof.

13. A platen, for use in the lamination of glass comprising a plurality of sheets of paper of varying size and a sheet of compressible material at one side of said sheets of paper.

14. A platen, for use in the lamination of glass, comprising a plurality of sheets of substantially incompressible material of varying size and a sheet of fabric at one side thereof.

15. A platen, for use in the lamination of glass comprising a plurality of superimposed sheets of paper of varying size, in thickness about .003 inch and a sheet of fabric at one side thereof.

16. A platen, for use in the lamination of non-circular sheets of glass, comprising a plurality of superimposed and transversely arranged sheets of substantially incompressible material and a base and a cover of compressible material at opposite sides of said substantially incompressible sheets.

17. A platen, for use in the lamination of glass, comprising a plurality of sheets of substantially incompressible material arranged in pyramidal form; a plurality of sheets of similar material superimposed upon said first named sheets and arranged transversely thereof; and a plurality of sheets of similar material overlying the second mentioned sheets.

18. A platen, for use in the lamination of glass, comprising a first group of sheets of substantially incompressible material, of varying sizes, arranged in pyramidal form; a second group of sheets, of unequal size, of similar material superimposed upon said first group, transversely thereof and substantially midway between their ends; a third group of sheets, of similar material, overlying the second group and transversely thereof, and a sheet overlying the third group and transversely thereof.

19. In the art of laminating glass, the step of expressing adhesive fluid from between laminæ which consists in initially applying pressure on the laminæ upon a substantially central region thereof, gradually increasing the pressure on said central region and progressively along separated areas extending in transverse directions, outwardly from said central region; continuing to increase said pressure and extending outwardly and laterally said separated areas until all of said areas merge into a single area comprising the entire laminæ.

In witness whereof, I have hereunto subscribed my name.

LOUIS BARTELSTONE.